April 5, 1966 L. W. FLOWERS 3,244,024
MINIATURE GEAR REDUCTION APPARATUS
Filed June 10, 1964 2 Sheets-Sheet 1
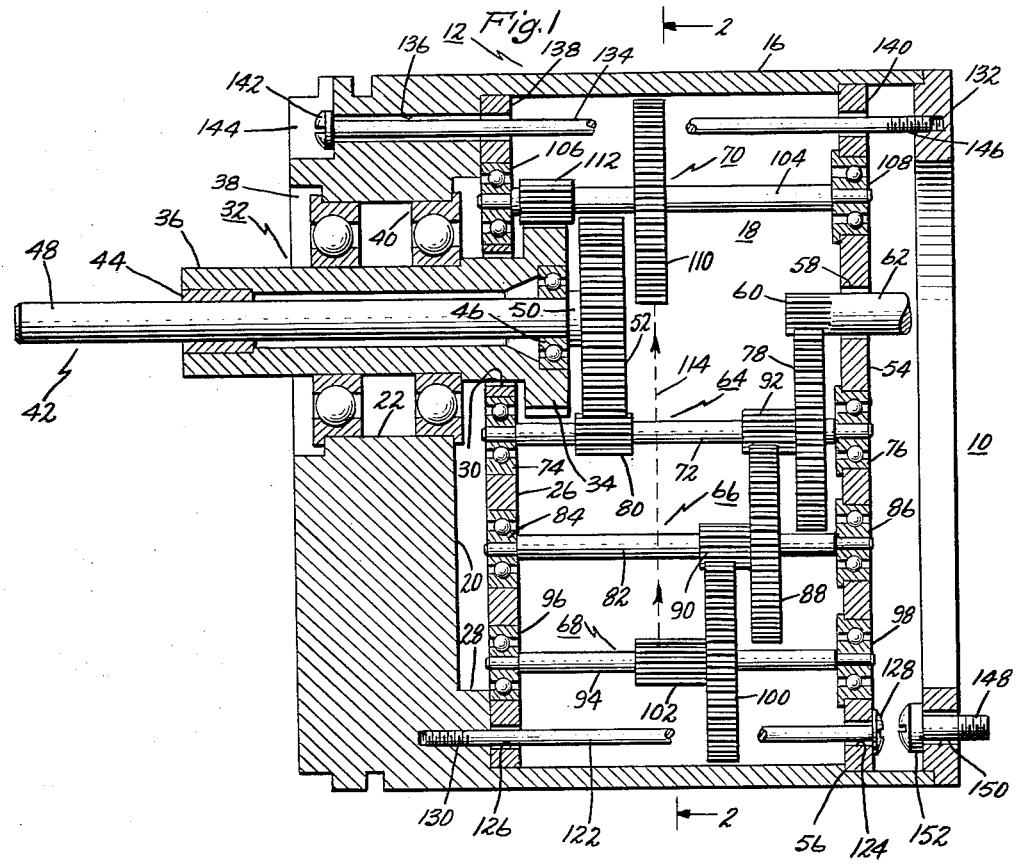
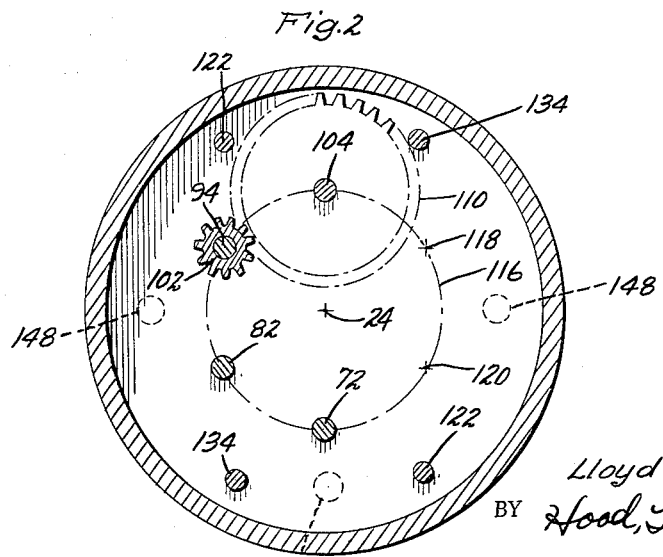
INVENTOR.
Lloyd W. Flowers,
BY Hood, Gust & Irish
Attorneys.

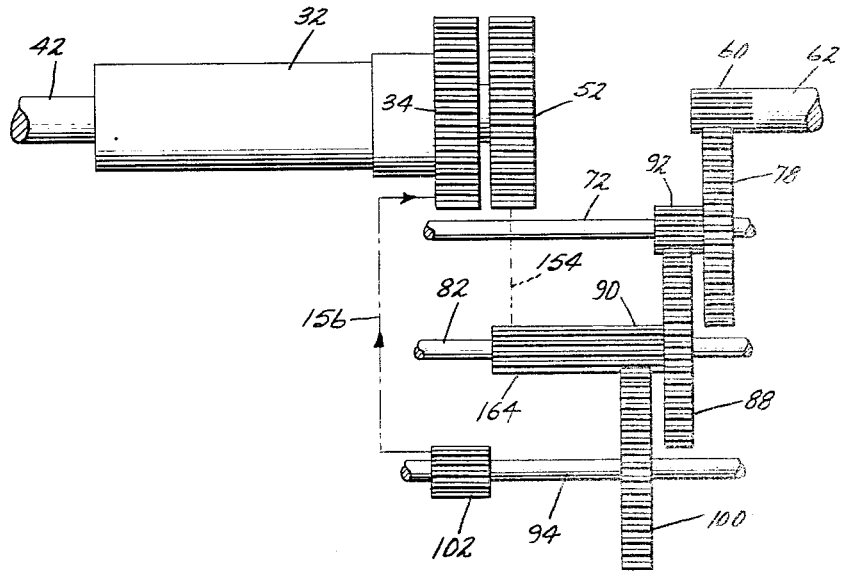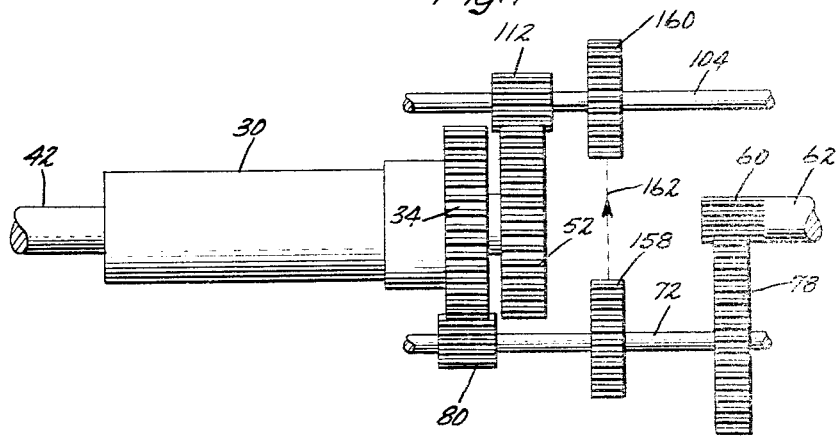

United States Patent Office 3,244,024
Patented Apr. 5, 1966

3,244,024
MINIATURE GEAR REDUCTION APPARATUS
Lloyd W. Flowers, Fort Wayne, Ind., assignor to Bowmar Instrument Corporation, Fort Wayne, Ind., a corporation of Indiana
Filed June 10, 1964, Ser. No. 373,923
5 Claims. (Cl. 74—665)

This invention relates generally to miniature gear reduction apparatus, and more particularly to a miniature dual speed coaxial gear reduction unit.

In certain computer, navigational and instrumentation systems, gear reduction units are employed for reducing the speed of a servo motor in order to drive other components such as potentiometers, switches and the like; gear reduction units which are mounted directly on a servo motor and are driven by a pinion cut in the servo motor shaft are referred to as "gear heads," whereas units having their own input shaft which is coupled to the servo motor shaft or other driving device are referred to as "speed reducers." In airborne applications in which size and weight considerations are critically important, it is required that such gear reduction units be highly miniaturized thus introducing special design problems not encountered in larger apparatus.

There are instances where it is desired to drive two different components at different rotational speeds and/or in different rotational directions from the same servo motor. This has conventionally been acomplished by driving the first component from a first gear head on the servo motor and in turn driving the second component by a separate speed reducer driven by the first component; this arrangement which requires two separate gear reduction units adds to the size, weight, and cost of the overall system. While gear reduction units having more than one output shaft and providing more than one output speed and/or direction of shaft rotation have been provided, to the best of the present applicant's knowledge such units have embodied output shafts which are eccentric to each other and with respect to the input shaft. There are instances, however, in which it is desired that the shafts of the driven components and the servo motor shaft be coaxial and it is therefore desirable to provide a miniature gear reduction unit providing dual output shaft speeds and/or directions of output shaft rotation with the output and input shafts being coaxial.

It is therefore an object of the invention to provide a miniature dual speed coaxial gear reduction unit.

Further objects and advantages of my invention will become apparent by reference to the following description and the acompanying drawings and the features of novelty which characterize my invention will be pointed out with particularity in the claims annexed to and forming a part of this specification.

In accordance with the broader aspects of the invention, first and second concentric output shafts are provided respectively having output gears thereon and an input gear is provided adapted to be driven by an input pinion coaxial with the output shafts. Gear train means are provided for respectively coupling the input gear and the output gears for independently driving the same.

In the drawing:

FIG. 1 is a longitudinal cross-sectional "stretch out" view of a gearhead incorporating the invention;

FIG. 2 is a conventional cross-sectional view taken along the line 2—2 of FIG. 1;

FIG. 3 is a fragmentary view showing modification of the gearhead of FIG. 1 to provide different reductions for the two output shafts; and FIG. 4 is another fragmentary view showing yet another modification of the gearhead of FIG. 1 to provide still different reductions.

Referring now to FIGS. 1 and 2 of the drawing, the improved gearhead of the invention, generally indicated at 10, comprises a housing 12 having an end wall 14 and a cylindrical side wall 16 defining a cavity 18 with the interior surface 20 of end wall 14. An opening 22 is formed in end wall 14 coaxial with longitudinal axis 24 of housing 12 and communicating with cavity 18. A first bearing plate 26 extends transversely across cavity 18 abutting an annular shoulder 28 formed on the inner surface of end wall 14, as shown. Bearing plate 26 has a central opening 30 formed therethrough coaxial with axis 24.

A first output shaft 32 is provided having a first output gear 34 formed at one end thereof. Output shaft 32 extends coaxially through opening 22 in end wall 14 and opening 30 in bearing plate 26 with output gear 34 being disposed in cavity 18 as shown. Output shaft 32 has an extension 36 which extends axially outwardly from the outer surface of end wall 14. Output shaft 32 is rotatably supported by means of suitable anti-friction bearings 38, 40 mounted in opening 22.

Output shaft 32 is formed as a tubular sleeve through which the second output shaft 42 coaxially extends. Output shaft 42 is rotatably supported within the tubular output shaft 32 by means of a suitable sleeve bearing 44 (or anti-friction bearing if space permits) in extension 36 of output shaft 32 and a suitable anti-friction bearing 46 within output gear 34. Output shaft 42 has an extension 48 which extends axially outwardly from extension 36 of output shaft 32 and another extension 50 which extends beyond output gear 34 into cavity 18. A second output gear 52 is mounted on extension 50 of output shaft 42 in cavity 18, as shown. It will thus be seen that the two output shafts 32, 42 and the respective output gears 34, 52, are coaxially rotatably supported in end wall 14 for independent rotation.

Another bearing plate 54 is provided extending transversely across cavity 18 of housing 12 and engaging a rabbet 56 formed in the inner surface of side wall 16; bearing plate 54 is axially spaced from bearing plate 26, as shown. Bearing plate 54 has a center opening 58 formed therein coaxial with axis 24 through which coaxial input pinion 60 extends; in the illustrated gearhead, input pinion 60 is cut in output shaft 62 of a servo motor (not shown) to which the gearhead 10 is attached, as will be hereinafter described.

A plurality, shown here as being four in number, of gear clusters 64, 66, 68, 70 are provided in cavity 18 respectively drivingly connecting the input pinion 60 and the two output gears 34, 52. Gear cluster 64 comprises a shaft 72 parallel with axis 24 and having its opposite ends respectively rotatably supported by suitable anti-friction bearings 74, 76 respectively mounted in bearing-receiving openings in the bearing plates 26, 54. Input gear 78 is mounted on shaft 72 and meshes with input pinion 60, being driven thereby. Output pinion 80 is mounted on shaft 72 and meshes with output gear 52 to drive the same. It will thus be seen that output shaft 42 is driven from input pinion 60 through two reductions, i.e., pinion 60 to gear 78 and pinion 80 to output gear 52. It will further be seen that by virtue of this double reduction, output shaft 42 and input pinion 60 will be rotated in the same rotational direction. Pinions 80 and 92 may have the same number of teeth, or different numbers of teeth depending upon the ratios desired.

Gear cluster 66 comprises shaft 82 parallel with axis 24 and having its opposite ends respectively rotatably supported by suitable anti-friction bearings 84, 86, respectively mounted in suitable bearing-receiving openings in the bearing plates 26, 54. Shaft 82 has a gear 88 and a pinion 90 mounted thereon, gear 88 meshing with pinion 92 mounted on shaft 72 of gear cluster 64.

Gear cluster 68 comprises shaft 94 parallel with axis 24 and having its opposite ends respectively rotatably supported by suitable anti-friction bearings 96, 98 respectively mounted in bearing-receiving openings in the bearing plate 26, 54. Shaft 94 has a gear 100 and a pinion 102 mounted thereon, gear 100 meshing with pinion 90 of gear cluster 66.

Gear cluster 70 comprises shaft 104 having its opposite ends respectively rotatably supported by suitable anti-friction bearings 106, 108 respectively mounted in bearing-receiving openings and bearing plates 26, 54. Shaft 104 has a gear 110 and a pinion 112 mounted thereon, gear 110 meshing with pinion 102 of gear cluster 68, as shown by the dashed line 114, and pinion 112 meshing with output gear 34 on output shaft 32. It will now be seen that output shaft 32 is driven from input pinion 60 through five reductions; pinion 60 to gear 78, pinion 92 to gear 88, pinion 90 to gear 100, pinion 102 to gear 110, and pinion 112 to gear 34; by virtue of the five reductions, it will be seen that direction of rotation of output shaft 32 is reversed from that of input shaft 62. It will further be observed that the speed reduction between input shaft 62 and output shaft 32 is substantially greater than the speed reduction between input shaft 62 and output shaft 42 by virtue of the fact that five reductions are provided between input shaft 62 and output shaft 32 whereas only two reductions are provided between input shaft 62 and output shaft 42.

Referring now particularly to FIG. 2, in the preferred embodiment gear cluster shafts 64, 66, 68 and 70 are equally spaced on a circle, shown in dashed lines at 116 concentric with axis 24 and having a radius equal to the spacing between the gear cluster shafts; it is thus seen that the gear cluster shafts 64, 66, 68 and 70 respectively lie at four of the six corners of a hexagon having sides equal in length to the radius of circle 116, the remaining two corners being shown at 118 and 120 in FIG. 2. It is thus seen that equal center distances are provided between the gear cluster shafts and the axis 24 of the input pinion 60 and the output gears 34, 52. It will also be seen that two additional gear clusters may be provided with their shafts respectively disposed on axes coinciding with points 118 and 120 in the circle 116.

It will be seen that by virtue of the provision of equal center distances, the input gear which meshes with the input gear 60 may be mounted on any one of the gear cluster shafts and likewise, that the output pinions which respectively mesh with the output gears 34, 52 may be mounted on any two of the gear cluster shafts, thus providing anywhere from two to seven reductions between the input pinion 60 and the output gears 34, 52. Thus, by selection of the number of gear clusters and the number of reductions between the input pinion 60 and the respective output gears 34, 52, either a small or a wide variation may be provided between the speeds of the two output shafts 32, 42 with the output shafts rotating either in the same or in opposite directions, depending upon the number of reductions provided. It will be understood, however, that equal center distances are not necessary for functioning of the device.

In the illustrated embodiment, bearing plate 54 is held in assembled relation, thereby to retain the gear clusters in assembled relation by means of through-bolts 122 extending through suitable openings 124, 126 formed in bearing plates 54, 26 with their head portions 128 engaging the outer surface of bearing plate 54 and their threaded portions 130 threadingly engaged in suitable tapped holes formed in the inner surface 20 of end wall 14. In order to mount the gearhead 10 upon a servo motor (not shown), a motor mounting ring 132 is provided secured to the open end of side wall 16 of housing 12 by means of through-bolts 134 extending through a suitable opening 136, 138 and 140 in end wall 14, and bearing plates 26, 54 with their head portions 142 seated in suitable recesses 144 formed in end wall 14 and with their threaded portions 146 threadingly engaged in suitable tapped holes formed in mounting ring 132. The gearhead 10 is attached to the servo motor by means of suitable bolts 148 respectively extending through suitable openings 150 in mounting ring 132 having their head portions 152 engaging the inner surface thereof. Four such mounting bolts 148 may be provided as shown in dashed lines in FIG. 2.

Referring now to FIG. 3, in which like elements are indicated by like reference numerals, another of the many combinations of reductions is shown. Here, input pinion 60 again meshes with input gear 78 on shaft 72 with pinion 92 again meshing with gear 88 on shaft 82 and pinion 90 again meshing with gear 100 on shaft 94. However, pinion 90 is extended so that its outer portion 164 meshes with output gear 52, as shown by the dashed line 154, while pinion 102 on shaft 94 meshes with output gear 34, as shown by the dashed line 156. Pinions 90 and 164 may be separate pinions having different numbers of teeth, if desired.

Here it is seen that three reductions are provided between input shaft 62 and output shaft 42 thereby providing reverse rotation and that four reductions are provided between input shaft 62 and output shaft 32 thus providing direct rotation and it will thus be seen that input shafts 32, 42 will be rotated in opposite directions and at different speeds.

Referring now to FIG. 4 in which like elements are still indicated by like reference numerals, yet another combination of gear clusters is shown in which the output shafts 32, 42 are rotated at the same speed but in opposite directions. Here, input pinion 60 again meshes with gear 78 on gear cluster shaft 72 and pinion 80 on shaft 72 again meshes with output gear 34 thus to rotate output shaft 32 in the same direction as the input shaft 62 with two reductions. Here, however, gears 158, 160 are respectively mounted on shafts 72, 104 and mesh as shown by the dashed line 162, gears 158, 160 having the same pitch and number of teeth thereby rotating shaft 104 in the opposite direction from shaft 72. Pinion 112 mounted on shaft 104 again meshes with output gear 52 and it will thus be seen that with output gears 34, 52 having the same number of teeth and pitch and with pinions 80, 112 having the same number of teeth and pitch, that output shafts 32, 42 will be rotated in opposite directions, but at the same rotational speed.

It will be readily apparent that a speed reducer unit may be provided rather than the gearhead construction shown in the drawings by merely providing bearings for the input shaft 62.

It will now be readily seen that as provided in accordance with the invention, a gear reduction device in which dual speed and/or dual rotation output shafts are provided coaxial with the input shaft with a wide variation of reductions between the input shaft and the two output shafts being available, it being observed that either the inner shaft or the outer shaft may be the high speed shaft and that either output shaft may be driven in either rotational direction depending upon the particular gear cluster each is driven from. It will be seen that the gear reduction unit of the invention permits the elimination of one gear reduction unit when it is desired coaxially to drive two components at different speeds and/or in different rotational directions from the same servo motor, thus permitting reduction in size, weight, and cost. It will further be observed that by virtue of the provision of equal center distances and the fact that the output gears are coaxially disposed on the axial center line of the unit, externally mounted gears of substantially unlimited diameter may be employed compared to the case of eccentric shaft multiple-output units which limited externally mounted gears to diameters sufficient to clear adjacent eccentric shafts.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. Miniature gear reduction apparatus comprising: first and second concentric output shafts respectively having output gears thereon; an input gear mounted on a third shaft having an axis spaced from and parallel with the axis of said output shafts, said input gear being adapted to be driven by an input pinion coaxial with said output shafts and forming a first gear reduction therewith; and other gear reduction means respectively coupling said third shaft and said output gears for independently driving the same.

2. Miniature gear reduction apparatus comprising: first and second concentric output shafts respectively having output gears thereon; an input gear mounted on a third shaft having an axis spaced from and parallel with the axis of said output shafts, said input gear being adapted to be driven by an input pinion coaxial with said output shafts and forming a first gear reduction therewith; second gear reduction means drivingly connecting said third shaft to one of said output gears for driving the same; and third gear reduction means drivingly connecting said second gear reduction means and the other of said output gears for independently driving the same.

3. Miniature gear reduction apparatus comprising: first and second concentric output shafts respectively having output gears thereon; and a gear train for independently driving said output gears from an input pinion coaxial with said output shafts and comprising a plurality of intermediate shafts respectively having axes spaced from and parallel with the axis of said output shafts, two of said plurality of shafts having output pinions thereon respectively meshing with said output gears for independently driving the same, an input gear on one of said plurality of shafts adapted to be driven by said input pinion and forming a first gear reduction therewith, and means respectively drivingly connecting said one shaft to said output pinions for independently driving the same, said last-named means including at least a second gear reduction means drivingly connecting said one shaft and one of said output pinions.

4. The apparatus of claim 3 wherein said intermediate shafts have their axes equally spaced on a circle concentric with said output shafts and having a radius equal to said spacing.

5. Miniature gear reduction apparatus comprising: a first output shaft having a first output gear mounted on one end thereof; a second tubular output shaft concentrically surrounding said first output shaft throughout a part of its length and having a second output gear mounted on one end thereof, said second output gear being axially spaced from said first output gear; bearing means respectively journaling said output shafts for independent rotation; and a gear train for independently driving said output gears from an input pinion coaxial with said output shafts and comprising a plurality of gear clusters each having at least a pinion and a gear mounted on a respective shaft, the pinions of two of said gear clusters respectively meshing with said output gears for independently driving the same, the gear of one of said gear clusters being adapted to be driven by said input pinion and forming a first gear reduction therewith, the pinions and gears of said gear clusters being drivingly interconnected and forming second and third gear reductions thereby independently to drive said output gears from said gear of said one gear cluster, said gear cluster shafts being parallel with said output shafts and having their axes equally spaced on a circle concentric with said output shafts and having a radius equal to said spacing.

References Cited by the Examiner

UNITED STATES PATENTS

| 2,755,685 | 7/1956 | Emrick | 74—665 |
| 2,968,965 | 1/1961 | Swanson et al. | 74—665 |

DON A. WAITE, *Primary Examiner.*

R. J. BIRD, *Assistant Examiner.*